United States Patent
Deng et al.

(10) Patent No.: US 9,767,456 B2
(45) Date of Patent: Sep. 19, 2017

(54) VIRTUAL MONEY BALANCE BYPASS INQUIRY METHOD, SYSTEM AND COMPUTER-READABLE STORAGE MEDIUM

(71) Applicant: Tencent Technology (Shenzhen) Company Limited, Shenzhen (CN)

(72) Inventors: Jianwei Deng, Shenzhen (CN); Ke Fan, Shenzhen (CN); Jun Zhou, Shenzhen (CN); Ding Zhang, Shenzhen (CN)

(73) Assignee: Tencent Technology (Shenzen) Company Limited, Shenzen (CN)

( * ) Notice: Subject to any disclaimer, the term of this patent is extended or adjusted under 35 U.S.C. 154(b) by 485 days.

(21) Appl. No.: 14/240,971

(22) PCT Filed: Nov. 28, 2012

(86) PCT No.: PCT/CN2012/085425
§ 371 (c)(1),
(2) Date: Feb. 25, 2014

(87) PCT Pub. No.: WO2013/078990
PCT Pub. Date: Jun. 6, 2013

(65) Prior Publication Data
US 2014/0297531 A1    Oct. 2, 2014

(30) Foreign Application Priority Data
Nov. 29, 2011    (CN) .......................... 2011 1 0387492

(51) Int. Cl.
*G06K 5/00*    (2006.01)
*G06Q 20/40*    (2012.01)
(Continued)

(52) U.S. Cl.
CPC ......... *G06Q 20/4033* (2013.01); *G06Q 20/06* (2013.01); *G06Q 20/0655* (2013.01);
(Continued)

(58) Field of Classification Search
CPC .......... G06K 5/00; G06F 17/00; G06Q 40/00; G07D 11/00; G07F 19/00
(Continued)

(56) References Cited

U.S. PATENT DOCUMENTS

2004/0049421 A1    3/2004    Hagiwara
2007/0255653 A1*   11/2007   Tumminaro ........... G06Q 20/10
                                                              705/39

(Continued)

FOREIGN PATENT DOCUMENTS

CN    1518714 A    8/2004
CN    101162521 A  4/2008
(Continued)

OTHER PUBLICATIONS

International Search Report of PCT/CH2012/085425 mailed Mar. 7, 2013; 3 pages.
(Continued)

*Primary Examiner* — Edwyn Labaze

(57) ABSTRACT

Provided is a virtual money balance bypass inquiry method, comprising: receiving a purchase demand submitted by a client, wherein the purchase demand contains the sum to be paid; receiving a balance inquiry request which is transmitted by the client in asynchronous mode, wherein the balance inquiry request contains the sum to be paid; inquiring the balance of a user account according to the balance inquiry request, and obtaining a result flag by comparing the balance of the user account with the sum to be paid; returning the result flag to the client in asynchronous mode.

14 Claims, 3 Drawing Sheets

(51) Int. Cl.
*G06Q 20/12* (2012.01)
*G06Q 20/06* (2012.01)
*G06Q 30/06* (2012.01)

(52) U.S. Cl.
CPC ......... *G06Q 20/12* (2013.01); *G06Q 20/4037* (2013.01); *G06Q 30/06* (2013.01)

(58) Field of Classification Search
USPC .............. 235/380, 375, 379, 487; 705/39–40
See application file for complete search history.

(56) References Cited

U.S. PATENT DOCUMENTS

| | | | |
|---|---|---|---|
| 2009/0094134 A1 | 4/2009 | Toomer et al. | |
| 2011/0196783 A1 | 8/2011 | Liwerant | |
| 2012/0221435 A1* | 8/2012 | Puura | G06Q 20/42 705/26.41 |
| 2013/0046684 A1* | 2/2013 | Driemeyer | G06Q 10/10 705/39 |
| 2013/0311369 A1* | 11/2013 | Elrod | G06Q 20/4016 705/44 |
| 2015/0242847 A1* | 8/2015 | Erdelyi | G06Q 20/38 705/14.33 |

FOREIGN PATENT DOCUMENTS

| | | |
|---|---|---|
| CN | 101470875 A | 7/2009 |
| CN | 101635075 A | 1/2010 |
| JP | 2003108777 A | 4/2003 |
| JP | 2010282605 A | 12/2010 |
| JP | 2011505602 A | 2/2011 |
| JP | 2011095944 A | 5/2011 |

OTHER PUBLICATIONS

SIPO, CN 2015101501285310, Office Action with English Summary, Oct. 20, 2015, 8 pgs.
SIPO, CN 2016031001209310, Office Action with English Summary, Mar. 15, 2016, 6 pgs.
SIPO, CN 2016082302039520, Office Action with English Summary, Aug. 26, 2016, 6 pgs.
CIPO, CA 2,856,639, Office Action, May 24, 2016, 6 pgs.

* cited by examiner

VIRTUAL MONEY BALANCE BYPASS INQUIRY METHOD, SYSTEM AND COMPUTER-READABLE STORAGE MEDIUM

CROSS-REFERENCE TO RELATED APPLICATIONS

This application is the National Stage of, and therefore claims the benefit of, International Application No. PCT/CN2012/085425, filed on Nov. 28, 2012, which claims priority to Chinese patent application No. 201110387492.0, filed on Nov. 29, 2011, the content of which is incorporated herein by reference in their entirety.

TECHNICAL FIELD

The present disclosure provides a virtual money balance bypass inquiry method, system and computer-readable storage medium, belonging to the virtual money payment technical field.

BACKGROUND

Virtual money is a kind of unreal electronic money for circulating through the virtual market over the Internet. In a current virtual money transaction procedure over the Internet, to ensure the security of the entire transaction procedure, the system will generally inquire a money balance of a user in the system according to the identity of the user that has been verified, and then determine whether the system can complete the current transaction of the user according to balance information and current transaction amount information. If it is determined that the current transaction can be completed, the current transaction amount of the user will be deducted; if it is determined that the current transaction cannot be completed, failure information about the current transaction will be returned to the user, notifying the user of insufficient balance.

Therefore, during a process of payment transaction, when the user confirmed the transaction after selecting the item(s) to be paid, the transaction system will firstly inquire the balance of the user account, and then return the result according to the actual transaction information. In the circumstance of the insufficient account balance, the system will directly return a transaction failure, which, as a result, will appear for multiple times in mass Internet applications, thus decreasing the success rate of payment of the system in practice. In addition, since the steps of the entire process of payment transaction are executed in sequence, the transaction system will be blocked for waiting for the return from the balance information inquiry before returning the result to the user, which will affect the performance of the system in practice. Also, the system may return a result completely opposite to what is expected by the user due to the insufficient balance, which will affect user's payment experiences.

SUMMARY

The present disclosure is concerned with addressing the problems with the existing virtual money transaction process where such transaction failures appear for multiple times in mass Internet applications due to the insufficient balance, which decreases the success rate of the payment of the system in practice, and where the system may return a result completely opposite to what is expected by the user due to the insufficient balance, which will affect user's payment experiences. For this purpose, the present disclosure provides a virtual money balance bypass inquiry method and system.

A virtual money balance bypass inquiry method comprises: receiving a purchase demand submitted by a client, wherein the purchase demand contains a sum to be paid; receiving a balance inquiry request which is transmitted by the client in asynchronous mode, wherein the inquiry request contains the sum to be paid; inquiring a balance of a user account according to the balance inquiry request, and obtaining a result flag by comparing the balance of the user account with the sum to be paid; returning the result flag to the client in asynchronous mode.

A virtual money balance bypass inquiry system comprises: a frontend receiving module, a frontend inquiry module, a balance inquiry module, and a result returning module. The frontend receiving module is configured to receive a purchase demand submitted by a client, wherein the purchase demand contains a sum to be paid; the frontend inquiry module is configured to receive a balance inquiry request which is transmitted by the client in asynchronous mode, wherein the inquiry request contains the sum to be paid; the balance inquiry module is configured to inquire a balance of a user account according to the received balance inquiry request, and obtain a result flag by comparing the balance of the user account with the sum to be paid; the result returning module is configured to return the result flag to the client in asynchronous mode.

A computer-readable storage medium in which computer-executable instructions are stored is provided, with the computer-executable instructions being used to instruct the computer to complete the following operations: receiving a purchase demand submitted by a client, wherein the purchase demand contains a sum to be paid; receiving a balance inquiry request which is transmitted by the client in asynchronous mode, wherein the inquiry request contains the sum to be paid; inquiring a balance of a user account according to the balance inquiry request, and obtaining a result flag by comparing the balance of the user account with the sum to be paid; returning the result flag to the client in asynchronous mode.

From the above technical solutions provided by the present disclosure, it can be seen that via the bypass inquiry on the balance, the inquiry on the balance of the user account is moved forward to an item selection stage which is prior to user's payment confirmation, thus improving the success rate of the transaction payment of the system; and the performance of the transaction payment is further improved due to the utilization of asynchronous inquiry on the balance.

DETAILED DESCRIPTION

To enable a clearer understanding of the technical solutions and the advantages of the present disclosure, a further detailed description of the embodiments of the present disclosure, by referring to the appended drawings, will be presented in the following.

Figure 1:
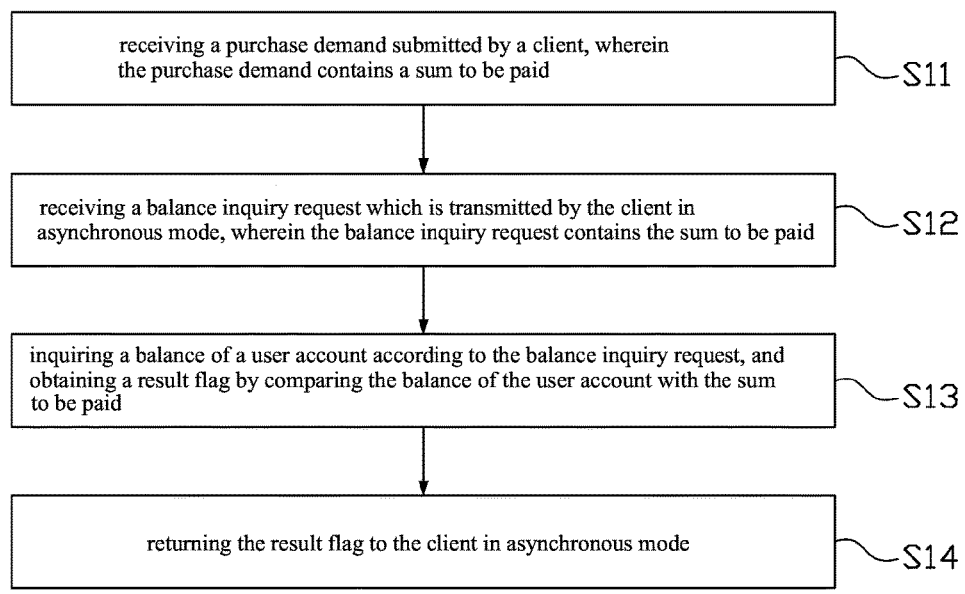
FIG. 1 shows a flowchart of a virtual money balance bypass inquiry method provided by a particular embodiment of the present disclosure.

A virtual money balance bypass inquiry method is provided by a particular embodiment of the present disclosure, comprising: receiving a purchase demand submitted by a client, wherein the purchase demand contains a sum to be paid; receiving a balance inquiry request of the client in asynchronous mode, wherein the balance inquiry request contains the sum to be paid; inquiring a balance of a user account according to the received balance inquiry request, and obtaining a result flag by comparing the balance of the user account with the sum to be paid; returning the result flag to the client in asynchronous mode. By referring to the appended drawings, a detailed description of this particular embodiment will be provided in the following, with taking a balance bypass inquiry for an online game as an example, wherein the corresponding virtual money balance bypass inquiry method comprises the following steps, as shown in FIG. 1.

Step S11, receiving a purchase demand submitted by a client, wherein the purchase demand contains the sum to be paid.

Specifically, when a user uses the virtual money for transaction, the purchase demand will firstly be generated, which contains the sum to be paid, the type and the quantity of the item(s) to be purchased, and so on. After being generated, the purchase demand will be transmitted to the client for being further processed by the client.

Step S12, receiving a balance inquiry request which is transmitted by the client in asynchronous mode, wherein the inquiry request contains the sum to be paid.

Specifically, before the user opens the virtual money payment interface and confirms the payment, to avoid the situation where a transaction failure is directly returned by the system due to the circumstance of the insufficient account balance, an asynchronous request can be transmitted via a frontend program to obtain the balance of the account corresponding to the user. Wherein, the corresponding balance inquiry request transmitted in asynchronous mode can be transmitted based on the form of the AJAX (Asynchronous JavaScript and XML) technique, or on the form of the JSONP protocol, with the balance inquiry request containing the corresponding sum to be paid. In addition, before the balance inquiry request being transmitted by the asynchronous request, the functions relevant to the payment, such as transaction quantity, transaction means, the sum to be paid, payment confirmation, etc., can be displayed on the frontend interface for user's transaction payment, so as to make the user better to obtain payment-relevant information and faster to complete the payment.

Step S13, inquiring the balance of the user account according to the balance inquiry request, and obtaining a result flag by comparing the balance of the user account with the sum to be paid.

Specifically, after receiving the balance inquiry request which is transmitted in asynchronous mode, a backend program will obtain a result flag by comparing the transaction payment information selected by the user with the balance of the virtual money account corresponding to the user, with the result flag only indicating whether the balance of the user account is greater than or equal to the sum to be paid.

Further, since the inquiry is conducted by means of asynchronous callback, to ensure the security of the balance information of the user account, a security encryption rule can be introduced into the process of balance inquiry, that is, the frontend program firstly encrypts the sum to be paid into a numeric string according to the security encryption rule, and then transmits it to the backend program. After obtaining the encrypted numeric string, the backend program restores the sum to be paid from the received numeric string according to the security encryption rule, obtains the result flag after comparing it with the balance of the user account, and encrypts the result flag into a numeric string according to the security encryption rule and then transmits it back to the client. In the entire process of balance bypass inquiry, the security encryption rule is saved in the frontend and backend programs, and only the result flag undergoing the rule, instead of the actual balance information of the user account, is returned during the interaction between the frontend and backend programs, which thus ensures the security of the information of the user account.

Step S14, returning the result flag to the client in asynchronous mode.

Specifically, when the frontend program receives the asynchronous result of the balance inquiry, it confirms the information indicated by the result flag. If the result flag indicates that the balance of the user account is greater than or equal to the sum to be paid, the user will be notified to confirm the payment; and if the result flag indicates that the balance of the user account is smaller than the sum to be paid, the user will be notified to recharge the account, and an entrance for recharging will be provided.

Figure 2:
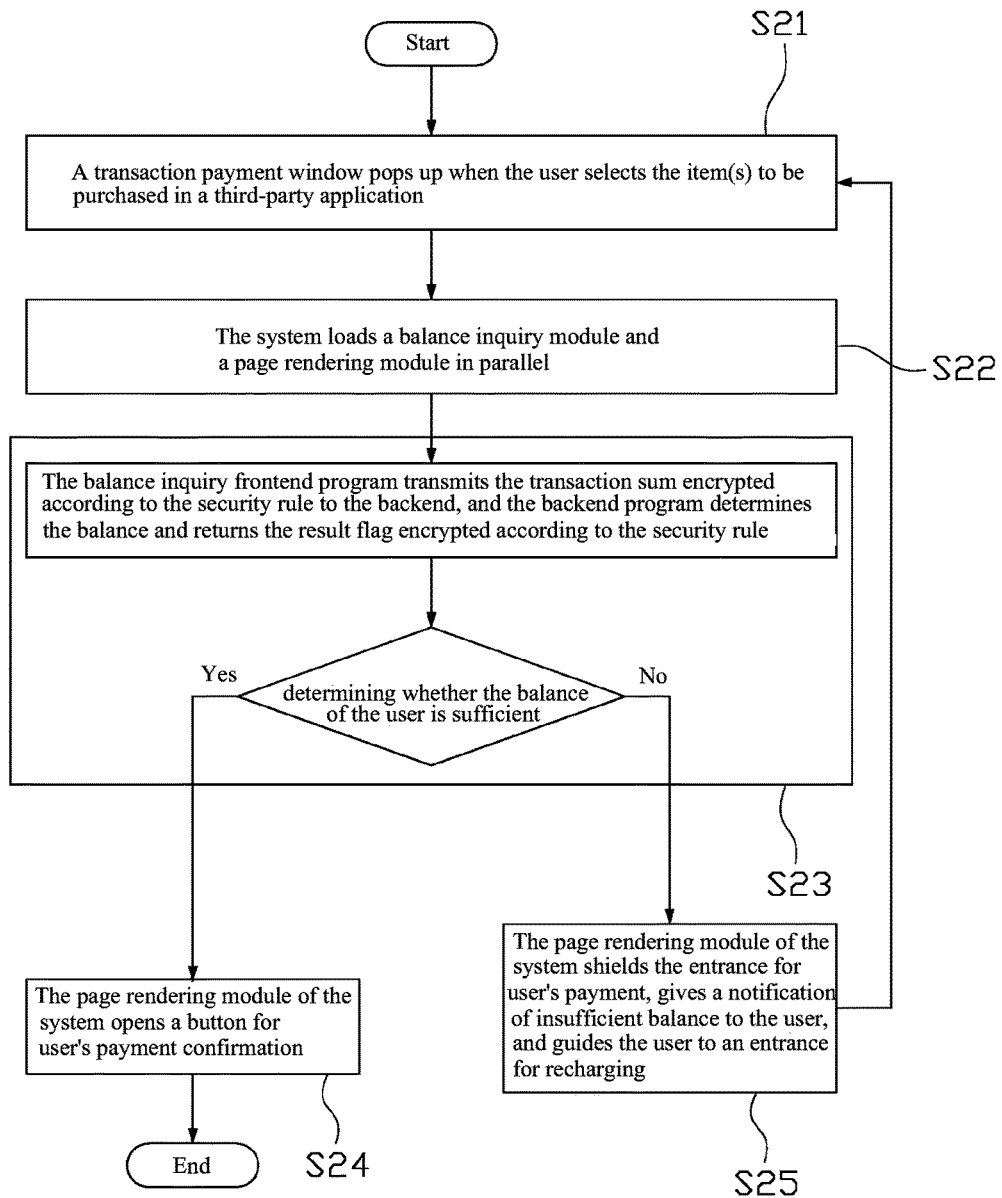
FIG. 2 shows a flowchart of a virtual money balance bypass inquiry method with the example of a user recharging for an online game, provided by a particular embodiment of the present disclosure.

An example of user's transaction and recharge for an online game will be given for illustrating the virtual money balance bypass inquiry method in the following, wherein as shown in FIG. 2, the method comprises that:

Step S21, a transaction payment window pops up when the user selects the item(s) to be purchased in a third-party application.

Step S22, the system loads a balance inquiry module at the time of loading a page rendering module.

Step S23, the frontend program of the balance inquiry module can transmit the transaction sum encrypted according to the security encryption rule to the backend, and the backend program determines whether the balance of the user is sufficient by comparing the balance of the user account with the sum to be paid and obtains the result flag. The system confirms the information indicated by the result flag returned according to Step S23, and if the user is qualified for the current transaction payment, it will proceed to Step S24, and otherwise, it will proceed to Step S25.

Step S24, a page rendering module of the system opens a button for user's payment confirmation.

Step S25, the page rendering module of the system shields the entrance for user's payment, gives a notification of insufficient balance to the user, and guides the user an entrance for recharging.

With the technical solution provided by the present embodiment, via the bypass inquiry on the balance of the user account, the inquire on the balance of the user account is moved forward to the item selection stage which is prior to user's payment confirmation, thus improving the success rate of the transaction payment of the system; the performance of the transaction payment is further improved due to the utilization of asynchronous inquiry on the balance; the security of the balance inquiry on the user account is ensured since the frontend and backend security encryption rule is introduced and only the encrypted result flag is returned as the result of the inquiry; and the user's transaction payment experiences are improved in that the user can know whether to recharge or to complete the transaction before being conducted to the current actual transaction payment.

Figure 3:
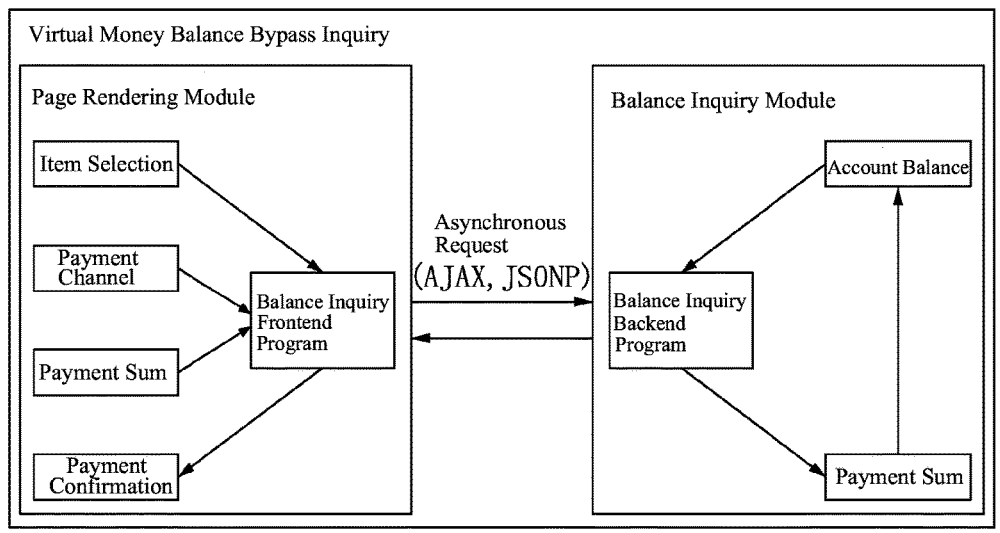
FIG. 3 shows a functional block diagram of a virtual money balance bypass inquiry system provided by a particular embodiment of the present disclosure.
Figure 4:
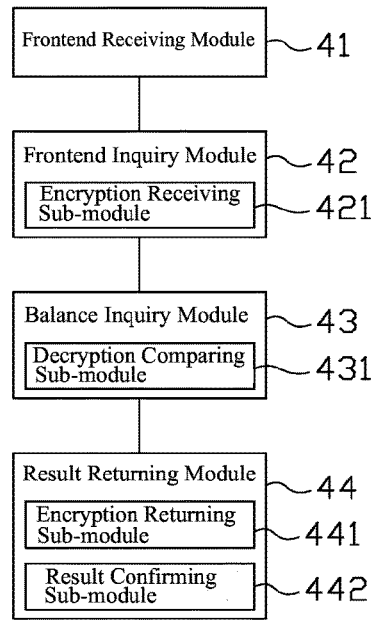
FIG. 4 shows a structure diagram of a virtual money balance bypass inquiry system provided by a particular embodiment of the present disclosure.

A particular embodiment of the present disclosure also provides a virtual money balance bypass inquiry system, with the system, as shown in FIG. 3, comprising a page rendering module configured to enable a transaction payment for a user, and a balance inquiry module configured to inquire the balance for the user, wherein the balance inquiry frontend program in the page rendering module displays to the user the transaction quantity, transaction means, the sum to be paid, payment confirmation, etc., and inquires the balance inquiry module for the balance by an asynchronous request; the balance inquiry backend program in the balance inquiry module determines whether the current payment can be completed or recharging is needed by comparing the sum to be paid with the balance of the user account, and transmits the result to the balance inquiry frontend program by an asynchronous request. By referring to the appended drawings, the virtual money balance bypass inquiry system provided by the present particular embodiment will be described in the following, as shown in FIG. 4, wherein the system comprises: a frontend receiving module 41, a frontend inquiry module 42, a balance inquiry module 43, and a result returning module 44.

The frontend receiving module 41 is configured to receive a purchase demand submitted by a client, wherein the purchase demand contains the sum to be paid.

The frontend inquiry module 42 is configured to receive a balance inquiry request which is transmitted by the client in asynchronous mode, wherein the inquiry request contains the sum to be paid.

The balance inquiry module 43 is configured to inquire the balance of the user account according to the received balance inquiry request, and obtain a result flag by comparing the balance of the user account with the sum to be paid.

The result returning module 44 is configured to return the result flag to the client in asynchronous mode.

Optionally, in the balance inquiry module 43, the result flag only indicates whether the balance of the user account is greater than or equal to the sum to be paid.

Optionally, the asynchronous mode is based on the AJAX technique or the JSONP protocol.

Optionally, the frontend inquiry module 42 comprises an encryption receiving sub-module 421, for receiving the numeric string obtained by encrypting the sum to be paid according to the security encryption rule; the balance inquiry module 43 comprises a decryption comparing sub-module 431 configured to restore the sum to be paid from the received numeric string according to the security encryption rule, and obtain the result flag after comparing it with the balance of the user account.

Optionally, the result returning module 44 comprises an encryption returning sub-module 441 configured to encrypt the result flag into a numeric string according to the security encryption rule and then transmit it back to the client. This result returning module 44 also further comprises a result confirming sub-module 442 configured to confirm the information indicated by the result flag, wherein if the result flag indicates that the balance of the user account is greater than or equal to the sum to be paid, the user will be notified to confirm the payment; and if the result flag indicates that the balance of the user account is smaller than the sum to be paid, the user will be notified to recharge the account, and an entrance for recharging will be provided.

The implementations of the processing functions of the various modules contained by the abovementioned virtual money balance bypass inquiry system have been described in the particular embodiments of the previous method, and no repeated description will be given herein.

With the technical solution provided by the present embodiment, via the bypass inquiry on the balance, the inquire on the balance of the user account is moved forward to the item selection stage which is prior to user's payment confirmation, thus improving the success rate of the transaction payment of the system; the performance of the transaction payment is further improved due to the utilization of asynchronous inquiry on the balance; the security of the balance inquiry on the user account is ensured since the frontend and backend security encryption rule is introduced and only the encrypted result flag is returned as the result of the inquiry; and the user's transaction payment experiences are improved in that the user can know whether to recharge or to complete the transaction before being conducted to the current actual transaction payment.

Those of ordinary skills in the art can understand that all or a part of the steps implementing the abovementioned embodiments can be achieved by hardware, or by a program which instructs the relevant hardware, wherein the program can be stored in a computer-readable storage medium, wherein the aforesaid storage medium can be a read-only memory, a disk or an optical disk, etc.

What is stated above is the preferable particular embodiments of the present disclosure, to which the scope of protection of the present disclosure is not limited. Within the technical scope disclosed by the present disclosure, any change or replacement which can be easily conceived by those skilled in the art shall be included in the scope of protection of the present disclosure. Therefore, the scope of protection of the present disclosure shall be based on the scope of protection of the claims.

With the technical solutions provided by the present disclosure, via the bypass inquiry on the balance, the inquire on the balance of the user account is moved forward to the item selection stage which is prior to user's payment confirmation, thus improving the success rate of the transaction payment of the system; the performance of the transaction payment is further improved due to the utilization of asynchronous inquiry on the balance; the security of the inquiry on the user account is ensured since the frontend and backend security encryption rule is introduced and only the encrypted result flag is returned as the result of the inquiry.

What is claimed is:

1. A virtual money balance bypass inquiry method, comprising:

receiving a purchase demand submitted by a client, wherein the purchase demand contains a sum to be paid;

receiving a balance inquiry request which is transmitted by the client in asynchronous mode, including receiving a numeric string obtained by encrypting the sum to be paid according to a security encryption rule, wherein the balance inquiry request contains the sum to be paid;

inquiring a balance of a user account according to the balance inquiry request, and obtaining a result flag by comparing the balance of the user account with the sum to be paid, including restoring the sum to be paid from the received numeric string according to the security encryption rule, and obtaining the result flu after comparing it with the balance of the user account;

prior to user's payment confirmation, returning the result flag to the client in asynchronous mode.

2. The virtual money balance bypass inquiry method of claim 1, wherein the result flag indicates whether the balance of the user account is greater than or equal to the sum to be paid.

3. The virtual money balance bypass inquiry method of claim 1, wherein the asynchronous mode is based on an AJAX technique or a JSONP protocol.

4. The virtual money balance bypass inquiry method of claim 1, wherein the step of returning the result flag to the client in asynchronous mode, comprises:
encrypting the result flag into a numeric string according to the security encryption rule and transmitting it back to the client.

5. The virtual money balance bypass inquiry method of claim 4, wherein the step of returning the result flag to the client in asynchronous mode, further comprises:
confirming the information indicated by the result flag, wherein if the result flag indicates that the balance of the user account is greater than or equal to the sum to be paid, the user will be notified to confirm payment; and if the result flag indicates that the balance of the user account is smaller than the sum to be paid, the user will be notified to recharge the account, and an entrance for recharging will be provided.

6. A virtual money balance bypass inquiry system, comprising:
a frontend receiving module, configured to receive a purchase demand submitted by a client, wherein the purchase demand contains a sum to be paid;
a frontend inquiry module, configured to receive a balance inquiry request which is transmitted by the client in asynchronous mode, wherein the frontend inquiry module comprises an encryption receiving sub-module configured to receive a numeric string obtained by encrypting the sum to be paid according to a security encryption rule, wherein the balance inquiry request contains the sum to be paid;
a balance inquiry module, configured to inquire a balance of a user account according to the balance inquiry request, and obtain a result flag by comparing the balance of the user account with the sum to be paid, wherein the balance inquiry module comprises a decryption comparing sub-module configured to restore the sum to be paid from the received numeric string according to the security encryption rule, and obtain the result flag after comparing it with the balance of the user account;
a result returning module, configured to, prior to user's payment confirmation, return the result flag to the client in asynchronous mode.

7. The virtual money balance bypass inquiry system of claim 6, wherein in the balance inquiry module, the result flag indicates whether the balance of the user account is greater than or equal to the sum to be paid.

8. The virtual money balance bypass inquiry system of claim 6, wherein the asynchronous mode is based on an AJAX technique or a JSONP protocol.

9. The virtual money balance bypass inquiry system of claim 6, wherein the result returning module comprises:

an encryption returning sub-module, configured to encrypt the result flag into a numeric string according to the security encryption rule and transmit it back to the client.

10. The virtual money balance bypass inquiry system of claim 9, wherein the result returning module further comprises:
a result confirming sub-module, configured to confirm the information indicated by the result flag, wherein if the result flag indicates that the balance of the user account is greater than or equal to the sum to be paid, the user will be notified to confirm payment; if the result flag indicates that the balance of the user account is smaller than the sum to be paid, the user will be notified to recharge the account, and an entrance for recharging will be provided.

11. A computer-readable storage medium, in which computer-executable instructions are stored, the computer-executable instructions being used to instruct a computer to complete the following operations:
receiving a purchase demand submitted by a client, wherein the purchase demand contains a sum to be paid;
receiving a balance inquiry request which is transmitted by the client in asynchronous mode, including receiving a numeric string obtained by encrypting the sum to be paid according to a security encryption rule, wherein the balance inquiry request contains the sum to be paid;
inquiring a balance of a user account according to the balance inquiry request, and obtaining a result flag by comparing the balance of the user account with the sum to be paid, including restoring the sum to be paid from the received numeric string according to the security encryption rule, and obtaining the result flag after comparing it with the balance of the user account;
prior to user's payment confirmation, returning the result flag to the client in asynchronous mode.

12. The computer-readable storage medium of claim 11, wherein the result flag indicates whether the balance of the user account is greater than or equal to the sum to be paid.

13. The computer-readable storage medium of claim 11, wherein the step of returning the result flag to the client in asynchronous mode, comprises:
encrypting the result flag into a numeric string according to the security encryption rule and transmitting it back to the client.

14. The computer-readable storage medium of claim 13, wherein the step of returning the result flag to the client in asynchronous mode, further comprises:
confirming the information indicated by the result flag, wherein if the result flag indicates that the balance of the user account is greater than or equal to the sum to be paid, the user will be notified to confirm payment; and if the result flag indicates that the balance of the user account is smaller than the sum to be paid, the user will be notified to recharge the account, and an entrance for recharging will be provided.

* * * * *